US008830311B2

(12) United States Patent
Wang et al.

(10) Patent No.: US 8,830,311 B2
(45) Date of Patent: Sep. 9, 2014

(54) POSITION DETECTING METHOD AND ELECTRONIC DEVICE IMPLEMENTING THE METHOD

(75) Inventors: Yin-Zhan Wang, Shenzhen (CN); Qiang You, Shenzhen (CN); Ren-Wen Huang, Shenzhen (CN); Ji-Xiang Yin, Shenzhen (CN); Tsung-Jen Chuang, New Taipei (TW); Shih-Fang Wong, New Taipei (TW)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 483 days.

(21) Appl. No.: 13/118,478

(22) Filed: May 30, 2011

(65) Prior Publication Data

US 2012/0182410 A1   Jul. 19, 2012

(30) Foreign Application Priority Data

Jan. 14, 2011   (CN) .......................... 2011 1 0008126

(51) Int. Cl.
H04N 9/47    (2006.01)
H04N 5/33    (2006.01)
(52) U.S. Cl.
USPC .. 348/77; 348/164; 348/E05.09; 348/E07.085

(58) Field of Classification Search
CPC .................................. A61B 1/041; H04N 7/18
See application file for complete search history.

(56) References Cited

U.S. PATENT DOCUMENTS

| | | | |
|---|---|---|---|
| 2003/0114972 A1* | 6/2003 | Takafuji et al. | 701/45 |
| 2005/0263682 A1* | 12/2005 | Eikenberry | 250/216 |
| 2008/0001735 A1* | 1/2008 | Tran | 340/539.22 |
| 2012/0002041 A1* | 1/2012 | Nejah | 348/135 |

* cited by examiner

Primary Examiner — Dave Czekaj
Assistant Examiner — Nam Pham
(74) Attorney, Agent, or Firm — Novak Druce Connolly Bove + Quigg LLP

(57) ABSTRACT

The disclosure provides an electronic device and a detecting position method adapted for the electronic device. The device stores an infrared sensing mode and a capture mode. The method includes steps of: entering the infrared sensing mode in response to an input signal and capturing infrared signals from an external environment, amplifying the infrared signals and converting the infrared signals into digital signals, evaluating whether part of the infrared signals falls into a predetermined waveband, if yes, focusing on an infrared thermal source whose infrared signals fall into the predetermined waveband, switching from the infrared sensing mode to the capture mode, taking a photo of the infrared thermal source, and processing the photo to identify a position of the infrared thermal source in the photo and displaying the position of the infrared thermal source in the photo.

5 Claims, 3 Drawing Sheets

POSITION DETECTING METHOD AND ELECTRONIC DEVICE IMPLEMENTING THE METHOD

BACKGROUND

1. Technical Field

The present disclosure relates to electronic devices and particularly, to a position detecting method applied in an electronic device and an electronic device implementing the method.

2. Description of Related Art

Accidents often happen, such as earthquakes. However, when an earthquake occurs, it is not uncommon for a victim to be trapped in debris, broken tiles, or rubble, even though there is a rescue team nearby the victim, the rescue team may not know the position of the victim, and the victim cannot quickly get rescued.

Therefore, it is necessary to provide an electronic device and a control method capable of overcoming the limitations described.

DETAILED DESCRIPTION

Figure 1:
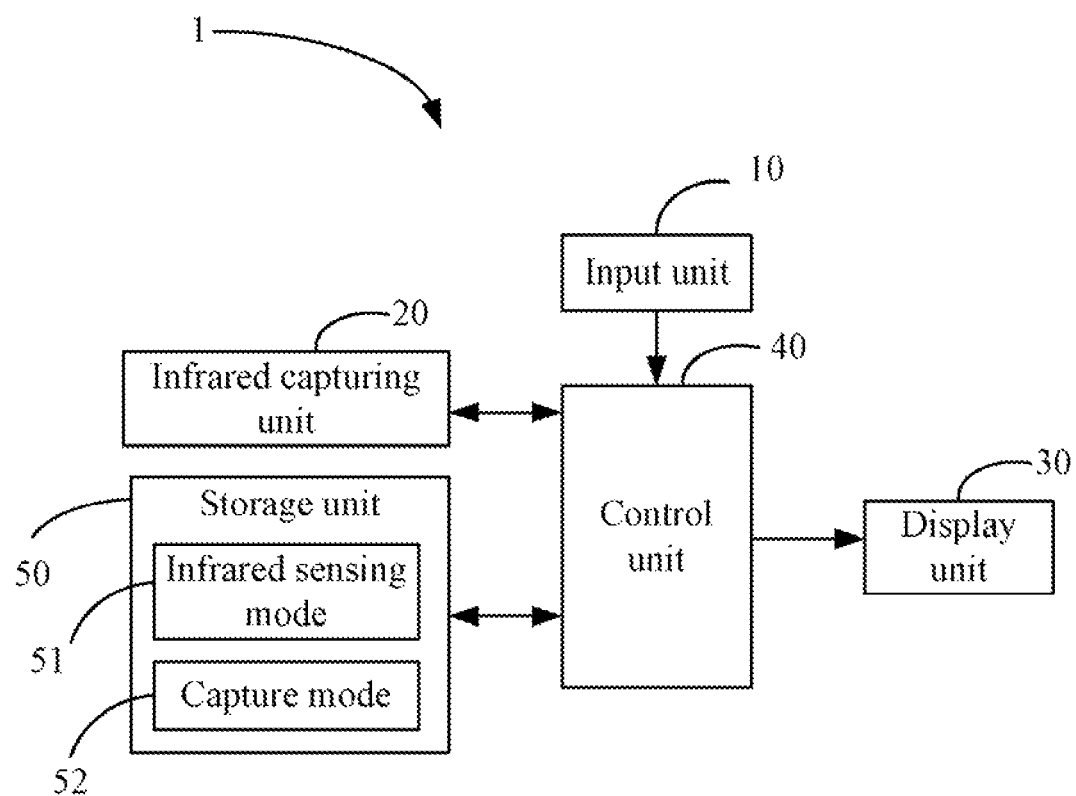
FIG. 1 is a block diagram of an electronic device, according to an exemplary embodiment.

FIG. 1 is a block diagram of an electronic device, according to an exemplary embodiment. The electronic device 1 is portable and may be carried by a user, such as a mobile phone or a PDA. The electronic device 1 includes an input unit 10, an infrared capturing unit 20, a display unit 30, a control unit 40, and a storage unit 50. The input unit 10 is configured for generating input signals in response to a user input. The display unit 30 is configured for displaying information.

The infrared capturing unit 20 is configured for capturing infrared signals around the electronic device 1 from an external environment and taking a photo. In the embodiment, the infrared capturing unit 20 is an infrared camera. The control unit 40 is configured for controlling the electronic device 1. The storage unit 50 is configured for storing an infrared sensing mode 51 and a capture mode 52. When the electronic device 1 enters the infrared sensing mode 51, the control unit 40 controls the infrared capturing unit 20 to capture the infrared signals around the electronic device 1. Many objects emit infrared signals, such as a human body. When the electronic device 1 enters the capture mode 52, the control unit 40 controls the infrared capturing unit 20 to take a photo.

Figure 2:
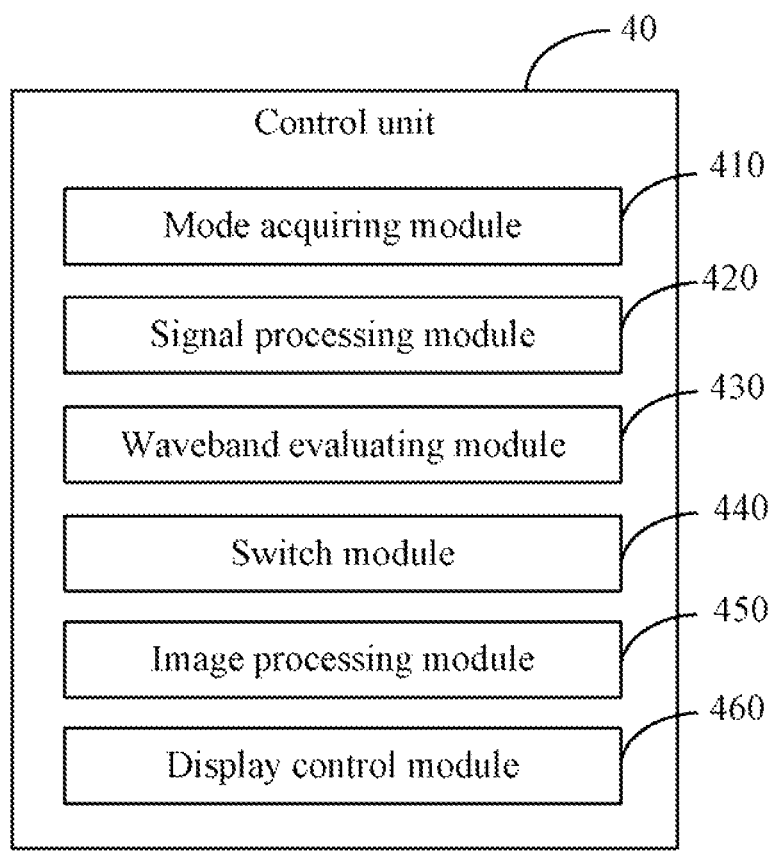
FIG. 2 is a block diagram of a control unit of the electronic device of FIG. 1.

As shown in FIG. 2, the control unit 40 further includes a mode acquiring module 410, a signal processing module 420, a waveband evaluating module 430, a switch module 440, an image processing module 450, and a display control module 460. The mode acquiring module 410 is configured for entering the infrared sensing mode 51 from the storage unit 50 in response to an input signal from the input unit 10 and controlling the infrared capturing unit 20 to capture infrared signals within a predetermined coverage area from the external environment. For example, the infrared capturing unit 20 captures the infrared signals radiated by some objects in a range of 5 meters.

The signal processing module 420 is configured for amplifying the captured infrared signals from the infrared capturing unit 20 and converting the infrared signals into digital signals. The waveband evaluating module 430 is configured for evaluating whether part of the infrared signals falls into a predetermined waveband. In the embodiment, the predetermined waveband is within wavelengths of about 9 to 10 um radiated by the human body. That means the waveband evaluating module 430 evaluates whether the infrared signals include signals radiated by the human body. When no infrared signals falls into the predetermined waveband, there is no victim near the electronic device 1.

When part of the infrared signals falls into the predetermined waveband, it means there is a victim near the electronic device 1, the image processing module 450 is configured for focusing on an infrared thermal source whose infrared signals fall into the predetermined waveband, that is, the infrared thermal source is associated with the victim. The switch module 440 is configured for switching the infrared capturing unit 20 from the infrared sensing mode 51 to the capture mode 52 and control the infrared capturing unit 20 to take a photo of a coverage area around the infrared thermal source. The coverage area may be within a radius of ten meters form the electronic device 1, such as and earthquake-stricken area. The image processing module 450 is further configured for processing the photo to identify the position of the infrared thermal source in the photo, thus to identify the position of the victim in the photo. The display control module 460 is configured for controlling the display unit 30 to display the position of the infrared thermal source in the photo.

Therefore, when the electronic device 1 is in a stricken area, such as an earthquake-stricken area, the user of the electronic device 1 may know the position of the infrared thermal source of an object in the photo on the display unit 30, such as a victim, and the victim can quickly get rescued.

Figure 3:
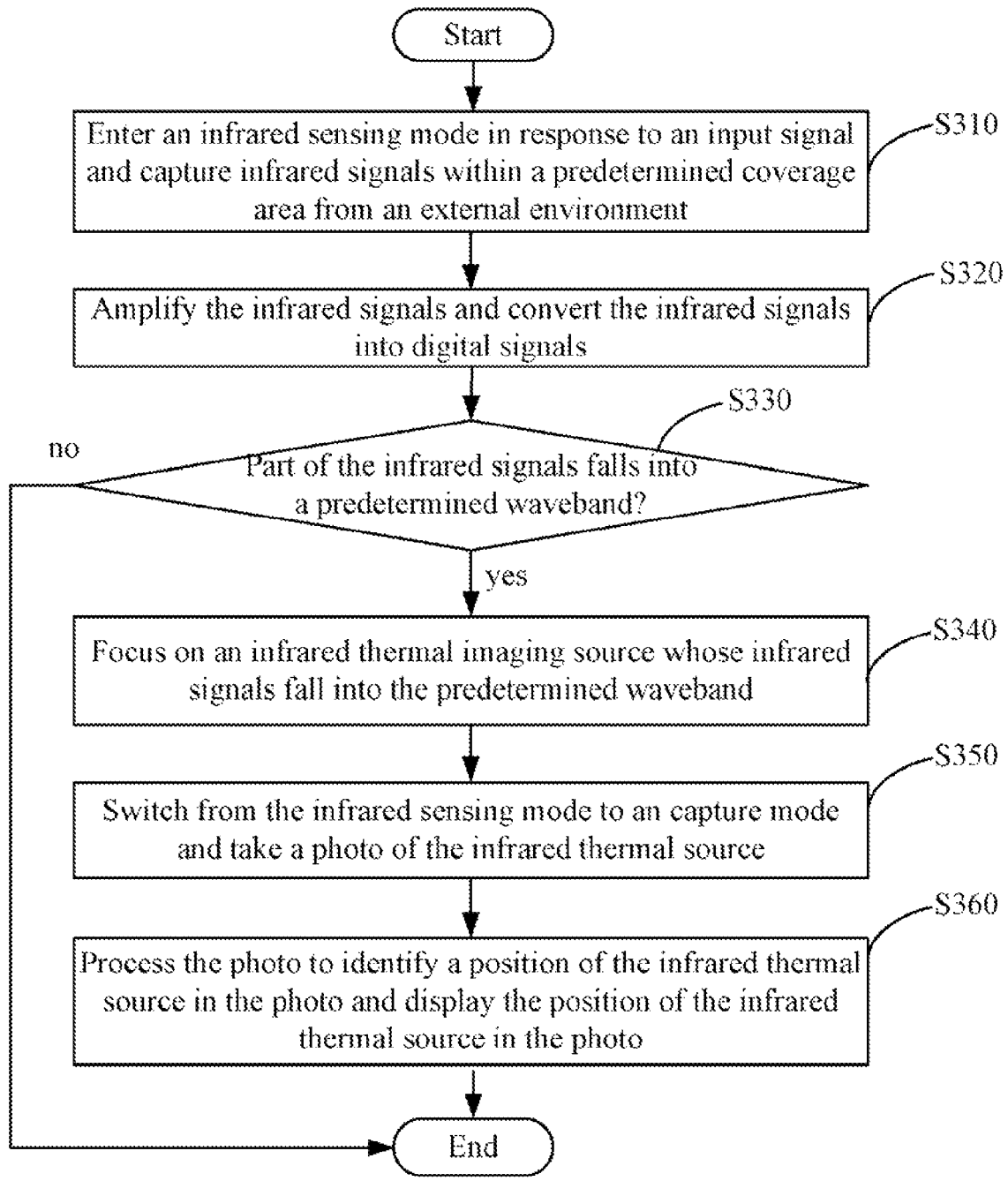
FIG. 3 is a flowchart of a method of detecting a position of an object, according to an exemplary embodiment.

FIG. 3 is a flowchart of a method of detecting a position of an object, according to an exemplary embodiment. In step S310, the mode acquiring module 410 enters the infrared sensing mode 51 from the storage unit 50 in response to the input signal from the input unit 10 and controls the infrared capturing unit 20 to capture the infrared signals within the predetermined coverage area from the external environment.

In step S320, the signal processing module 420 amplifies the captured infrared signals from the infrared capturing unit 20 and converts the infrared signals into the digital signals. In step S330, the waveband evaluating module 430 evaluates whether part of the infrared signals falls into the predetermined waveband, if no infrared signal falls into the predetermined waveband, the procedure ends.

If part of the infrared signals falls into the predetermined waveband, in step S340, the image processing module 450 focuses on the infrared thermal source whose infrared signals fall into the predetermined waveband. In step S350, the switch module 440 switches the infrared capturing unit 20 from the infrared sensing mode 51 to the capture mode 52 and controls the infrared capturing unit 20 to take a photo of the infrared thermal source. In step S360, the image processing module 450 processes the photo to identify the position of the infrared thermal source in the photo and the display control module 460 controls the display unit 30 to display the position of the infrared thermal source in the photo.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device for detecting a position of an object, comprising:
   a storage unit for storing an infrared sensing mode and a capture mode;
   an input unit for generating input signals in response to a user input;
   a display unit for displaying information;
   an infrared capturing unit for capturing infrared signals around the electronic device from an external environment and taking a photo; and
   a control unit for entering the infrared sensing mode in response to an input signal from the input unit and controlling the infrared capturing unit to capture the infrared signals around the electronic device from the external environment, amplifying the infrared signals and converting the infrared signals into digital signals, evaluating whether part of the infrared signals falls into a predetermined waveband, focusing on an infrared thermal source associated with the object whose infrared signals fall into the predetermined waveband, switching the infrared capturing unit from the infrared sensing mode to the capture mode and taking a photo of a coverage area around the infrared thermal source, processing the photo to identify a position of the infrared thermal source in the photo, and controlling the display unit to display the position of the infrared thermal source in the photo.

2. The electronic device as recited in claim 1, wherein the infrared capturing unit is an infrared camera.

3. The electronic device as recited in claim 1, wherein the predetermined waveband is with wavelengths of about 9 to 10 um radiated by a human body.

4. A method for detecting a position of an object by an electronic device, wherein the electronic device stores an infrared sensing mode and a capture mode, the method comprising:
   entering the infrared sensing mode in response to an input signal and capturing infrared signals around the electronic device from an external environment;
   amplifying the captured infrared signals and converting the infrared signals into digital signals;
   evaluating whether part of the infrared signals falls into a predetermined waveband;
   upon a condition that part of the infrared signals falls into the predetermined waveband, focusing on an infrared thermal source associated with the object whose infrared signals fall into the predetermined waveband;
   switching from the infrared sensing mode to the capture mode and taking a photo of a coverage area around the infrared thermal source; and
   processing the photo to identify a position of the infrared thermal source in the photo and displaying the position of the infrared thermal source in the photo.

5. The method as recited in claim 4, wherein the predetermined waveband is within wavelengths of about 9 to 10 um radiated by a human body.

* * * * *